(12) United States Patent
Murayama (10) Patent No.: US 6,844,985 B2
(45) Date of Patent: Jan. 18, 2005

(54) ENDOSCOPE OBJECTIVE OPTICAL SYSTEM

(75) Inventor: Minoru Murayama, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/405,624

(22) Filed: Apr. 3, 2003

(65) Prior Publication Data

US 2003/0189768 A1 Oct. 9, 2003

(30) Foreign Application Priority Data

Apr. 5, 2002 (JP) ........................................ 2002-103244

(51) Int. Cl.$^7$ .......................... G02B 15/14; G02B 21/02
(52) U.S. Cl. ..................... 359/686; 359/660; 359/682
(58) Field of Search ................................. 359/680–682, 359/686, 683, 676, 656–660; 600/160, 168; 348/45; 396/17

(56) References Cited

U.S. PATENT DOCUMENTS

| | | | | |
|---|---|---|---|---|
| 4,674,844 | A | * 6/1987 | Nishioka et al. | ............. 359/782 |
| 4,976,522 | A | * 12/1990 | Igarashi | ..................... 359/680 |
| 5,721,642 | A | * 2/1998 | Shibayama et al. | ......... 359/686 |
| 6,353,504 | B1 | 3/2002 | Yamamoto | .................. 359/686 |
| 6,433,937 | B1 | 8/2002 | Konno | ........................ 359/682 |

FOREIGN PATENT DOCUMENTS

| | | |
|---|---|---|
| JP | 2876252 | 1/1999 |
| JP | 11295596 | 10/1999 |
| JP | 2000330024 | 11/2000 |
| JP | 200191832 | 4/2001 |
| JP | 2001166203 | 6/2001 |

OTHER PUBLICATIONS

English Lannguage Translation of JP Appln. No. 2876252.
English Language Translation of JP Appln. No. 11–295596.
English Language Translation of JP Appln. No. 2000–330024.
English Language Translation of JP Appln. No. 2001–166203.

* cited by examiner

Primary Examiner—Jordan M. Schwartz
(74) Attorney, Agent, or Firm—Greenblum & Bernstein, P.L.C.

(57) ABSTRACT

An endoscope objective optical system includes a negative first lens group, a positive second lens group, a positive third lens group, and a negative fourth lens group, in this order from the object. The positive second lens group and the positive third lens group are arranged to move while the object distance is varied without changing the overall length from the first lens group to an imaging plane. Due to this arrangement, the focal length of the endoscope objective optical system is varied while maintaining an in-focus state.

12 Claims, 9 Drawing Sheets

Fig. 1

Fig. 2A
FE=5.74
— SA
-- SC
-0.20    0.20
SPHERICAL
ABERRATION

THE SINE
CONDITION

Fig. 2B
FE=5.74
—— d Line
······ g Line
---- C Line
-0.20    0.20
SPHERICAL
ABERRATION

CHROMATIC
ABERRATION

Fig. 2C
W=70.6°
-0.02    0.02
LATERAL
CHROMATIC
ABERRATION

Fig. 2D
W=70.6°
— S
-- M
-0.20    0.20
ASTIGMATISM

Fig. 2E
W=70.6°
-50 (%) 50
DISTORTION

-0.20  0.20
SPHERICAL
ABERRATION

THE SINE
CONDITION

Fig. 4B
FE=6.72

—— d Line
······ g Line
--- C Line

-0.20  0.20
SPHERICAL
ABERRATION

CHROMATIC
ABERRATION

Fig. 4C
W=29.5°

-0.02  0.02
LATERAL
CHROMATIC
ABERRATION

-0.20  0.20
ASTIGMATISM

Fig. 4E
W=29.5°

-50 (%) 50
DISTORTION

SPHERICAL      SPHERICAL      LATERAL        ASTIGMATISM    DISTORTION
ABERRATION     ABERRATION     CHROMATIC
                              ABERRATION
THE SINE       CHROMATIC
CONDITION      ABERRATION

—— d Line
······ g Line
- - - C Line

— S
-- M

-0.20   0.20
SPHERICAL
ABERRATION
THE SINE
CONDITION

-0.20   0.20
SPHERICAL
ABERRATION
CHROMATIC
ABERRATION

-0.02   0.02
LATERAL
CHROMATIC
ABERRATION

-0.20   0.20
ASTIGMATISM

-50 (%) 50
DISTORTION

Fig. 9

Fig. 10A 
FE=5.78
— SA
-- SC
-0.20  0.20
SPHERICAL
ABERRATION
THE SINE
CONDITION

Fig. 10B 
FE=5.78
—— d Line
······ g Line
---- C Line
-0.20  0.20
SPHERICAL
ABERRATION
CHROMATIC
ABERRATION

Fig. 10C 
W=69.8°
-0.02  0.02
LATERAL
CHROMATIC
ABERRATION

Fig. 10D 
W=69.8°
— S
-- M
-0.20  0.20
ASTIGMATISM

Fig. 10E 
W=69.8°
-50 (%) 50
DISTORTION

—— d Line
······· g Line
- - - - C Line

—— S
- - M

-0.20  0.20   -0.20  0.20   -0.02  0.02   -0.20  0.20   -50 (%)  50
SPHERICAL    SPHERICAL    LATERAL      ASTIGMATISM   DISTORTION
ABERRATION   ABERRATION   CHROMATIC
                          ABERRATION
THE SINE     CHROMATIC
CONDITION    ABERRATION

Fig. 17

ENDOSCOPE OBJECTIVE OPTICAL SYSTEM

BACKGROUND OF THE INVENTION

1. Field of the Invention

The present invention relates to an endoscope objective optical system in which the focal length is variable by moving a portion of a lens group. Due to such an endoscope objective optical system, normal viewing at a wide viewing angle and magnified viewing at a high magnification are possible.

2. Description of the Prior Art

As an endoscope objective optical system which enables normal viewing and magnified viewing, an endoscope viewing optical system, in which the focal length is varied by moving a portion of a lens group, has been known in the art. In the case where only one movable lens group is provided, the magnification range of the movable lens group generally has a magnification 1:1 in order to maintain compactness of the entire optical system, and to increase the magnification ratio while the overall length of the optical system remains unchanged. The distance between an object and the image plane (i.e., the object-image distance) becomes the shortest when the magnification of the movable lens group is 1:1. However, if the movable lens group is moved, from this shortest-distance position, in a direction along which the magnification becomes larger, the object distance becomes longer, so that the endoscope viewing optical system with the single movable lens group is unsuitable for the use in the intermediate focal length range.

In U.S. Pat. No. 6,433,937, magnification is changed by moving only one lens group, and an embodiment in which the movable lens group does not have the magnification of 1:1 is disclosed. However, in this embodiment, magnification is made larger under the condition that the object distance is made extremely shorter to the extent of about 0.8 mm (in the case where the focal length at the short focal length extremity is 1 mm). As a result, there are areas where the amount of lighting is insufficient. Furthermore, in order to achieve a wider angle-of-view at a normal viewing state, the diameter of the first lens group is increased. In Japanese Patent No. 2876252, since magnification is changed by a lens group with strong negative power, a large number of lens elements are required to correct aberrations.

In Japanese Unexamined Patent Publication No. Hei-11-295596, a lens group and an imaging device are movable; however, an imaging device, such as a CCD, requires a signal-processing circuit board, cables and so forth attached thereto, so that a strong driving force is necessary to move these elements. In particular, in the case where the lens group is driven via an actuator or motor, etc., it is important to reduce the load on the movable lens group (body). Accordingly, it is desirable for the image plane to remain at a fixed position regardless of the change in magnification.

JUPP No.2001-166203 and U.S. Pat. No. 6,353,504 are examples of the prior art in which magnification is changed by moving a plurality of lens groups.

JUPP No.2001-166203 discloses a three-lens-group arrangement of the negative-positive-positive lens groups in which the second and third lens groups are moved to change magnification; however, the optical power (hereinafter, power) of the second lens group is weak, so that the magnification ratio is small. Furthermore, field curvature is large at a magnified viewing state.

UPP No. 2001-91832 (which is a family member of U.S. Pat. No. 6,353,504) discloses a four-lens-group arrangement of the negative-positive-negative-positive lens groups in which the third lens group and the second or fourth lens group are moved to change magnification; however, since the power of the third lens group is strong, the number of lens elements is large to correct aberrations, and the overall length of the optical system becomes long.

SUMMARY OF THE INVENTION

The present invention provides an endoscope objective optical system in which (i) the focal length is variable by moving a portion of a lens group, (ii) normal viewing at a wide viewing angle and magnified viewing at a high magnification are possible, (iii) the overall length is made shorter, and (iv) the diameter of the lens group is made smaller.

According to an aspect of the present invention, there is provided an endoscope objective optical system including a negative powered (hereinafter, negative) first lens group, a positive powered (hereinafter, positive) second lens group, a positive third lens group, and a negative fourth lens group, in this order from the object.

The positive second lens group and the positive third lens group are arranged to move while the object distance is varied without changing the overall length from the first lens group to the image plane. Due to this arrangement, the focal length of the endoscope objective optical system is varied while an in-focus state is maintained.

The endoscope objective optical system preferably satisfies the following condition:

$$-10 < f4/fw < -3 \qquad (1)$$

wherein f4 designates the focal length of the negative fourth lens group; and fw designates the focal length of the entire endoscope objective optical system at the short focal length extremity.

The negative first lens group preferably includes a negative single lens element which can satisfy the following condition:

$$-2 < f1/fw < -1.2 \qquad (2)$$

wherein f1 designates the focal length of the negative first lens group.

The endoscope objective optical system can satisfy the following conditions:

$$1.2 < f2/fw < 2.1 \qquad (3)$$

$$0.5 < (f23t \times fw)/(f23w \times ft) < 1.5 \qquad (4)$$

wherein f2 designates the focal length of the positive second lens group;

f23t designates the combined focal length of the positive second lens group and the positive third lens group when the entire endoscope objective optical system is at the maximum magnification position;

f23w designates the combined focal length of the positive second lens group and the positive third lens group at the short focal length extremity; and ft designates the focal length of the entire endoscope objective optical system at the maximum magnification position.

The present disclosure relates to subject matter contained in Japanese Patent Application No. 2002-103244 (filed on Apr. 5, 2002) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 17:
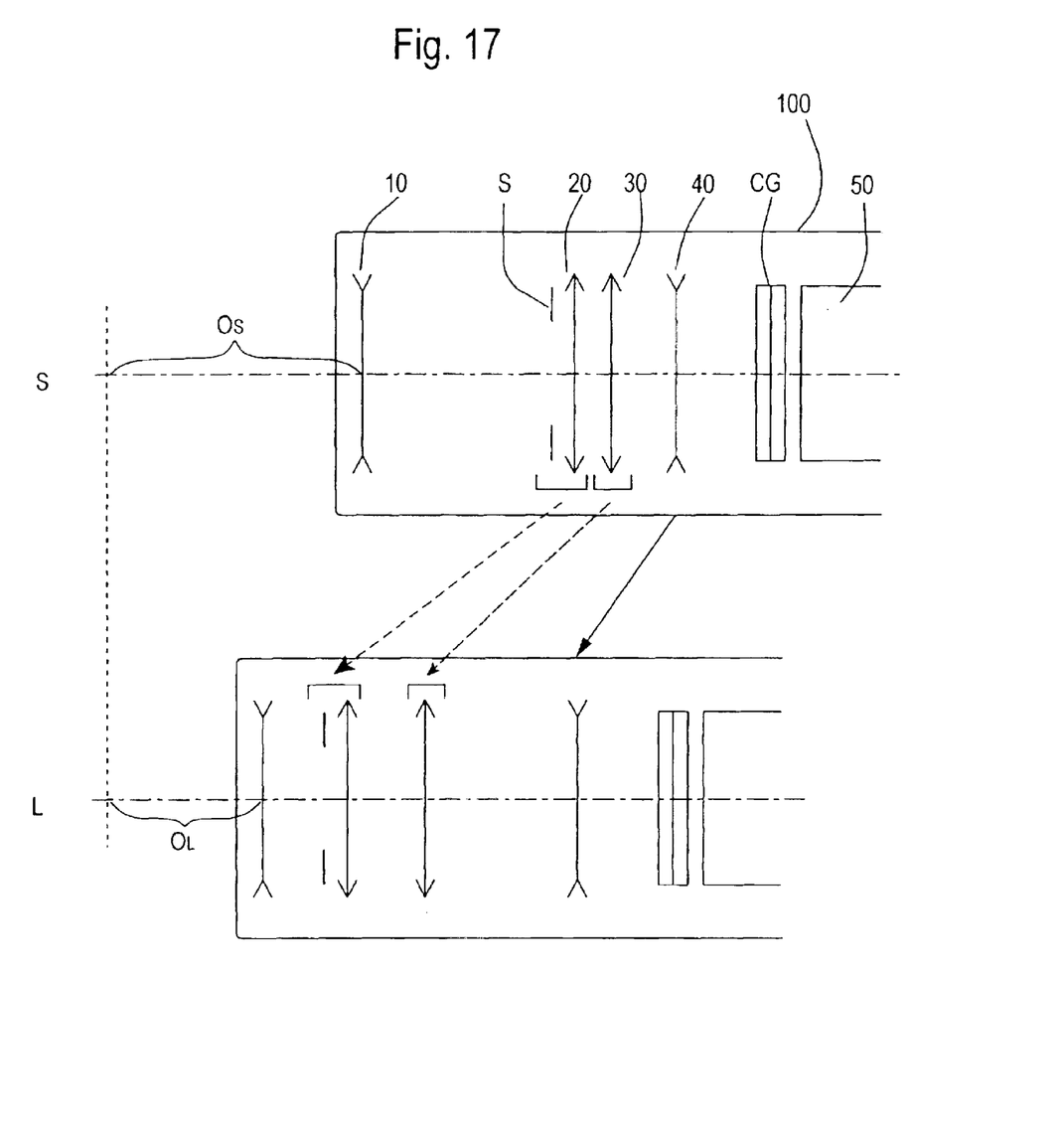
FIG. 17 shows the endoscope objective optical system mounted to the front end of an electronic endoscope, and schematic lens-group moving paths of the endoscope objective optical system.

FIG. 17 shows an embodiment of an endoscope objective optical system applied to an electronic endoscope. The endoscope body-insertion portion 100 is provided therein with a stationary negative first lens group 10, a diaphragm S, a movable positive second lens group 20, a movable positive third lens group 30, a stationary negative fourth lens group 40, a cover glass (filter group) CG, and an imaging device 50, in this order from the object. The diaphragm S is mounted to the positive second lens group 20 and moves together therewith.

In the above-described endoscope objective optical system, in order to translate from a normal viewing state at a wide angle position to a magnified viewing state, the positive second lens group 20 and the positive third lens group 30 are each individually moved toward the object so as to vary the focal length of the entire endoscope objective optical system, while the object distance is being made shorter, i.e., the body-insertion portion 100 is brought more closely to a target object to be viewed. Due to the movement of the positive second lens group 20 and the positive third lens group 30, the minimum magnification extremity (of the endoscope objective optical system) is changed to the maximum magnification extremity without changing the overall length between the negative first lens group 10 and the imaging device 50 (image plane).

In other words, from the state where the object distance Os at the short focal length extremity S is defined as a reference distance, the positive second lens group 20 and the positive third lens group 30 are each individually moved toward the object so as to reduce an in-focus object distance OL toward the maximum magnified viewing position L. On the other hand, the distance from the negative first lens group 10 to the imaging device 50 (image plane) does not change.

Note that depending on the moving-paths of the positive second lens group 20 and the positive third lens group 30, even if the object distance and magnification are changed monotonously when a normal viewing state at a wide angle position is translated into a magnified viewing state, it is sometimes the case that the change in focal length of the entire endoscope objective optical system does not become monotonous. This is because halfway through this translation, the focal length reaches the maximum value; on the other hand, the focal length at the maximum magnification position becomes shorter than the maximum focal length.

Accordingly, due to the movement of the positive second lens group 20 and the positive third lens group 30, the image plane remains stationary with respect to the negative first lens group 10 when the translation from a normal viewing state at a wide angle position to a magnified viewing state is carried out; and furthermore, the change in the in-focus object distance can be made monotonously.

If the change in the in-focus object distance is not monotonous, the object may relatively move either toward or away from the negative first lens group 10 when the translation from a normal viewing state at a wide angle position to a magnified viewing state is carried out. More specifically, in the above non-monotonous change in the in-focus object distance, through the operations on a continuous translation from a normal viewing state to a magnified viewing state, the front end of the endoscope approaches closely to the object at first; however, after that, the front end thereof has to be moved away from the object, which deteriorates the operability of the endoscope, and requires the user to practice the use of the endoscope. Therefore the monotonous change in the in-focus object distance is important in the case of viewing in an intermediate area between the short focal length extremity and the maximum magnification position.

One of the features of the present invention is that the negative fourth lens group 40 is provided at the rear side (image plane side) of the movable lens group (the positive second lens group 20 and the positive third lens group 30). In order to achieve a wide viewing angle at a normal viewing state while achieving a small lens diameter, it is preferable to increase the negative power of the first lens group 10.

However, if the negative power of the first lens group 10 is simply made stronger, the magnification of the negative first lens group 10 becomes smaller. Accordingly, there is a need to reduce the positive power of the movable lens group in order to obtain a higher magnification at a magnified viewing state. On the other hand, if the positive power of the movable lens group is made weaker, the traveling distance thereof becomes longer, so that the overall length of the optical system also becomes longer.

For the purpose of avoiding such a drawback, the negative fourth lens group 40 is, as explained, provided at the rear side (image plane side) of the movable lens group (the positive second lens group 20 and the positive third lens group 30). Due to this arrangement, the negative fourth lens group 40 works to increase magnification; thereby, the power of the positive second lens group 20 and that of the positive third lens group 30 can be made stronger, so that the overall length of the optical system can be made shorter.

Condition (1) specifies the focal length of the negative fourth lens group 40.

If f4/fw exceeds the lower limit of condition (1), magnification of the negative fourth lens group 40 becomes smaller, so that it is difficult to increase the magnification of the entire endoscope objective optical system while the overall length thereof is made shorter.

If f4/fw exceeds the upper limit of condition (1), the negative power of the fourth lens group 40 becomes stronger, so that telecentricity of the endoscope objective optical system deteriorates.

In order to reduce the overall length of the endoscope objective optical system, the negative first lens group 10 can include a negative single lens element, and the negative single lens element preferably satisfies condition (2).

If f1/fw exceeds the lower limit of condition (2), the diameter of the negative lens element becomes larger if an attempt is made to obtain a wider angle-of-view at a normal viewing state, and field curvature is increased at a magnified viewing state.

If f1/fw exceeds the upper limit of condition (2), magnification of the negative first lens group 10 becomes smaller. Accordingly, if an attempt is made to increase magnification of the entire endoscope objective optical system at a magnified viewing state, the focal length of the positive lens group becomes longer, so that the apparatus accommodating the endoscope objective optical system is increased in size. Furthermore, astigmatism and coma which occur in the negative first lens group 10 become larger, so that it is difficult to correct these aberrations with the other lens groups.

Condition (3) specifies the focal length of the positive second lens group 20.

If f2/fw exceeds the lower limit of condition (3), sufficient magnification cannot be obtained at a magnified viewing state.

If f2/fw exceeds the upper limit of condition (3), the traveling distance of the positive second lens group 20 becomes loner in order to make the magnification ratio larger, and the overall length of the endoscope objective optical system becomes longer.

Condition (4) specifies the range of change in the combined focal length of the movable lens groups (the positive second lens group 20 and the positive third lens group 30).

If (f23t×fw)/(f23w×ft) exceeds the lower limit of condition (4), the change in power of the movable lens groups is larger when magnification is changed, so that fluctuations of aberrations become larger, and it becomes difficult to balance aberrations over each focal length range.

If (f23t×fw)/(f23w×ft) exceeds the upper limit of condition (4), the distance between the positive second lens group 20 and the positive third lens group 30 becomes longer, so that the overall length of the endoscope objective optical system becomes longer.

Specific numerical data of the embodiments will be described hereinafter.

In the diagrams of spherical aberration and the sine condition, the solid line and the of dotted line respectively indicate spherical aberrations SA and the sine condition SC.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

Also, In the diagrams of astigmatism, S designates the sagittal image, and M designates the meridional image.

In the tables, m designates the lateral magnification of the entire endoscope objective optical system, f designates the focal length of the entire endoscope objective optical system, ODIS designates the object distance (the equivalent air thickness along the optical axis from the object to the most object-side lens surface), $f_B$ designates the back focal distance (the equivalent air thickness along the optical axis from the most image-side surface of the cover glass CG to the image plane of the imaging device 50), FE designates the effective f-number, W designates the half angle-of-view (*), r designates the radius of curvature, d designates the lens-element thickness or distance between lens elements, $N_d$ designates the refractive index of the d-line, and $v_d$ designates the Abbe number.

[Embodiment 1]

Figure 1:
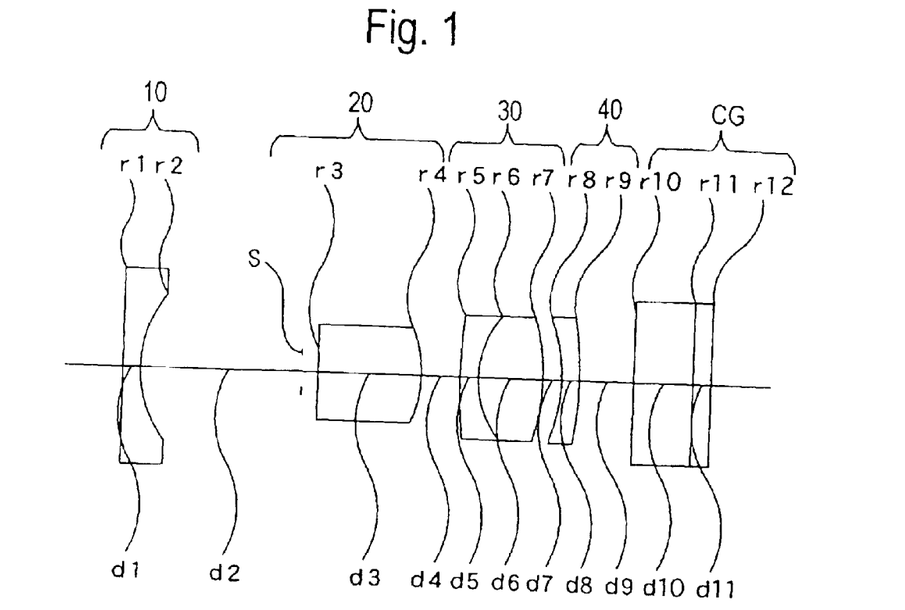
FIG. 1 is a lens arrangement of an endoscope objective optical system at the short focal length extremity (the minimum magnification position), according to a first embodiment of the present invention.
Figures 2A, 2B, 2C:
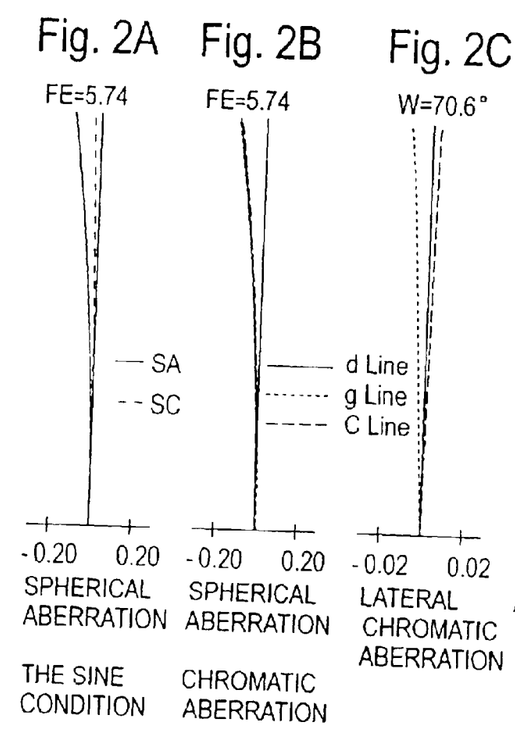
FIGS. 2A, 2B, 2C, 2D and 2E show aberrations occurred in the lens arrangement of FIG. 1.
Figure 2D:
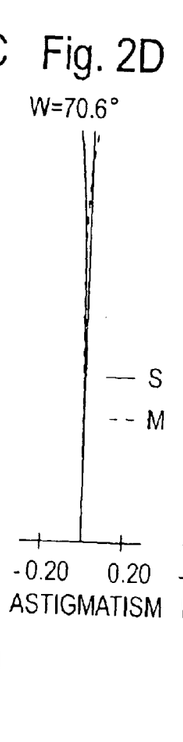
Figure 2E:
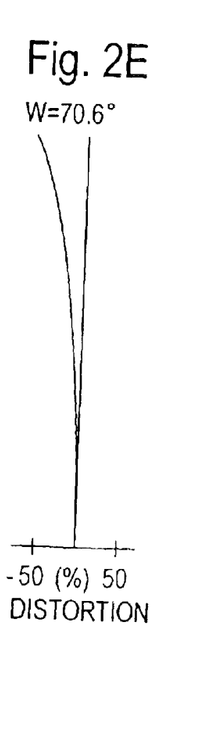
Figure 3:
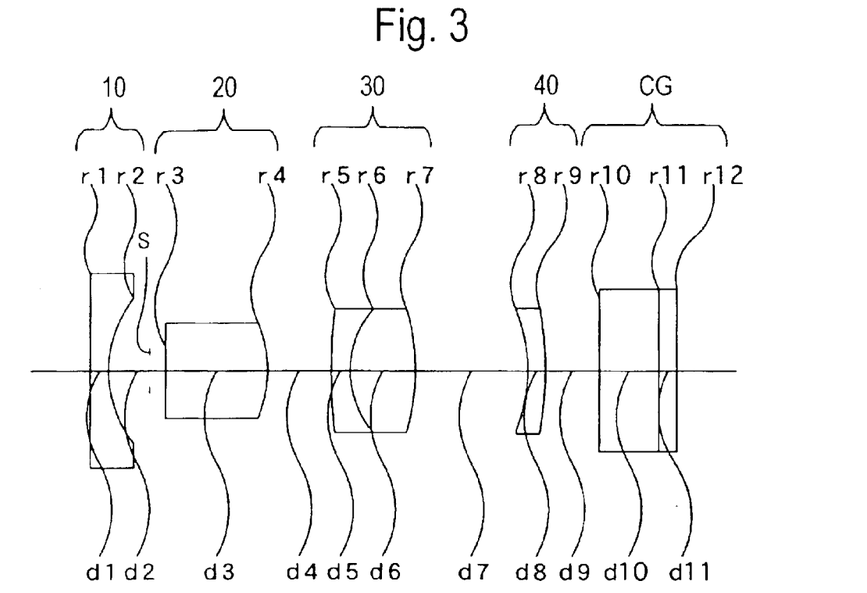
FIG. 3 is a lens arrangement, at the maximum magnification position, of the endoscope objective optical system according to the first embodiment.
Figure 4A:
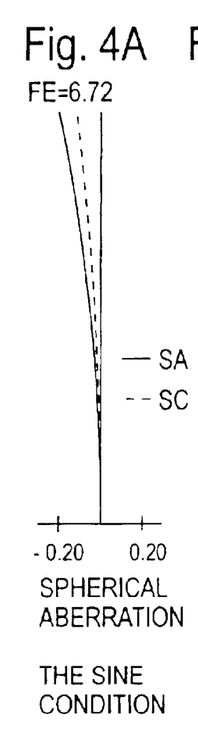
FIGS. 4A, 4B, 4C, 4D and 4E show aberrations occurred in the lens arrangement of FIG. 3.
Figures 4B, 4C:
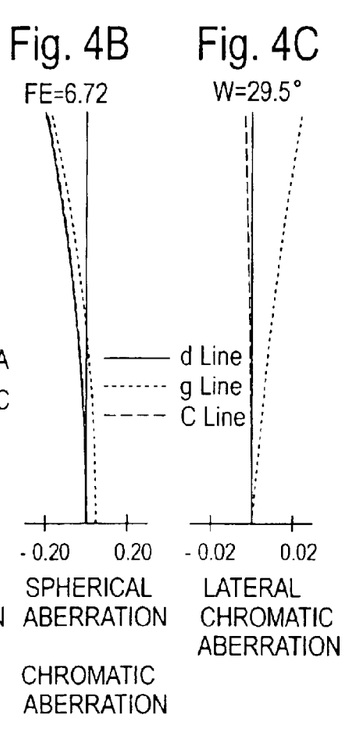
Figures 4D, 4E:
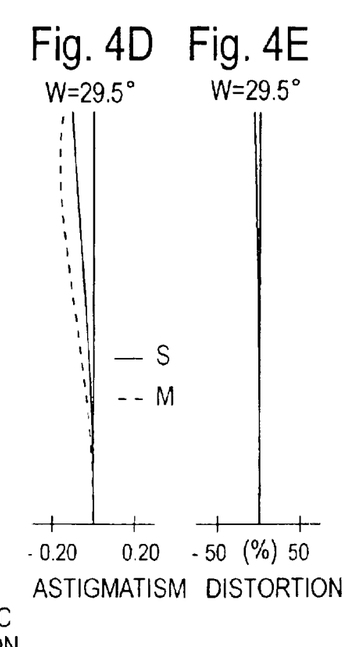

FIG. 1 is a lens arrangement of an endoscope objective optical system at the short focal length extremity (the minimum magnification position), according to the first embodiment. FIGS. 2A through 2E show aberrations occurred in the lens arrangement of FIG. 1. FIG. 3 is a lens arrangement, at the maximum magnification position, of the endoscope objective optical system according to the first embodiment. FIGS. 4A through 4E show aberrations occurred in the lens arrangement of FIG. 3. Table 1 shows the numerical values of the first embodiment. The negative first lens group 10 includes a negative single lens element, the positive second lens group 20 includes a single lens element, the positive third lens group 30 includes cemented lens elements having a negative lens element and a positive lens element, and the negative fourth lens group 40 is includes a single lens element. The diaphragm S is provided 0.278 from the front side (object side) of the positive second lens group 20 (surface No.3).

TABLE 1

| | |
|---|---|
| m | −0.119—0.827 |
| f | 1.320–2.000 |
| ODIS | −10.00—2.50 |
| $f_B$ | 0.050–0.050 |
| FE | 5.74–6.72 |
| w | 70.6–29.5 |
| f1 | −2.264 |
| f2 | 2.380 |
| f4 | −6.246 |
| f23t | 2.198 |
| f23w | 2.060 |

TABLE 1-continued

| Surf. No. | r | d | $N_d$ | $v_d$ |
|---|---|---|---|---|
| 1 | ∞ | 0.300 | 1.88300 | 40.8 |
| 2 | 1.999 | 3.007–0.978 | — | — |
| 3 | −221.978 | 1.736 | 1.87433 | 43.3 |
| 4 | −2.069 | 0.651–1.078 | — | — |
| 5 | 9.374 | 0.312 | 1.84666 | 23.8 |
| 6 | 1.631 | 1.100 | 1.66792 | 62.7 |
| 7 | −3.552 | 0.321–1.922 | — | — |
| 8 | −2.749 | 0.300 | 1.85026 | 32.3 |
| 9 | −5.986 | 0.923 | — | — |
| 10 | ∞ | 1.000 | 1.51633 | 64.1 |
| 11 | ∞ | 0.300 | 1.53113 | 62.4 |
| 12 | ∞ | — | — | — |

[Embodiment 2]

Figure 5:
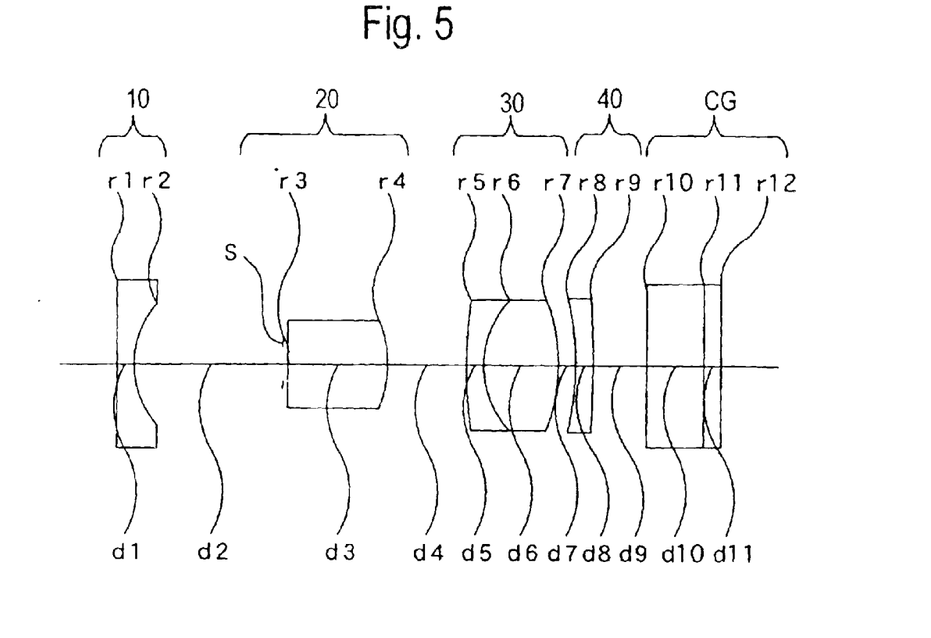
FIG. 5 is a lens arrangement of an endoscope objective optical system at the short focal length extremity (the minimum magnification position), according to a second embodiment of the present invention.
Figure 6A:
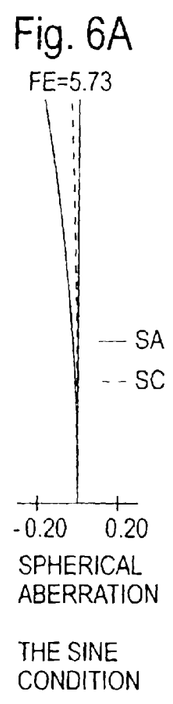
FIGS. 6A, 6B, 6C, 6D and 6E show aberrations occurred in the lens arrangement of FIG. 5.
Figures 6B, 6C:
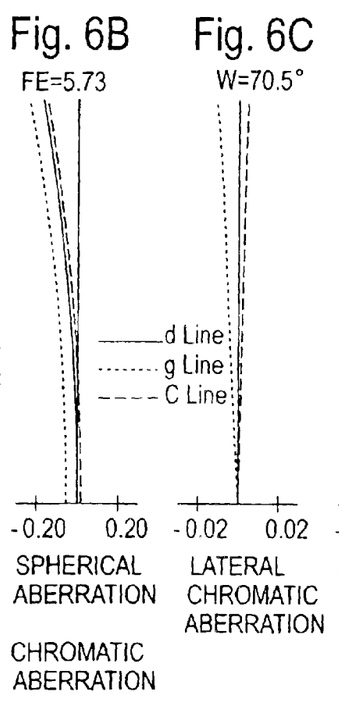
Figure 6D:
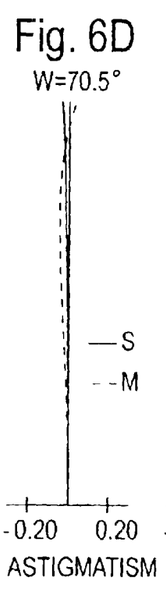
Figure 6E:
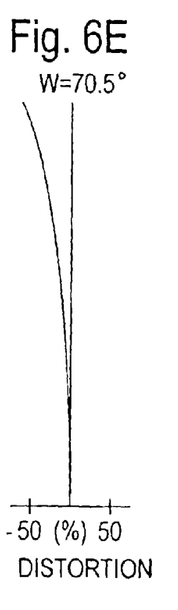
Figure 7:
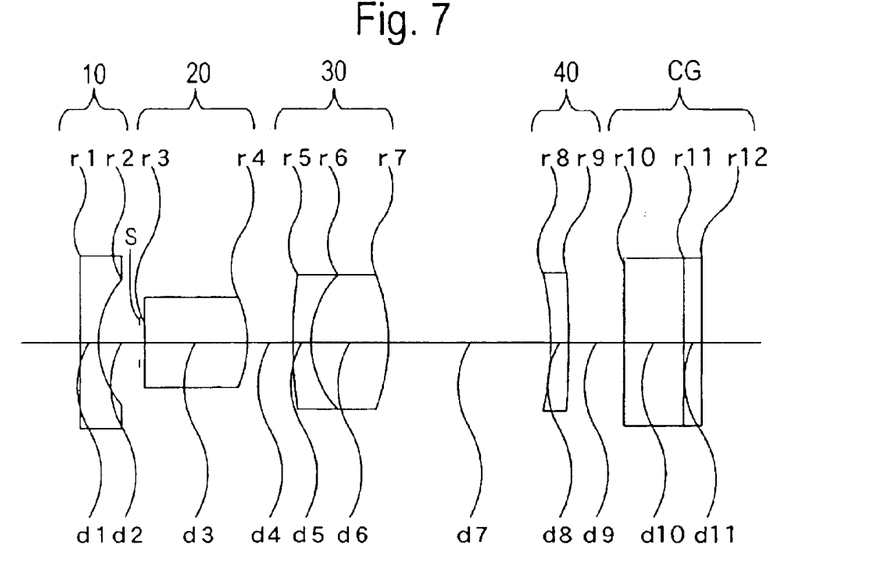
FIG. 7 is a lens arrangement, at the maximum magnification position, of the endoscope objective optical system according to the second embodiment.
Figure 8A:
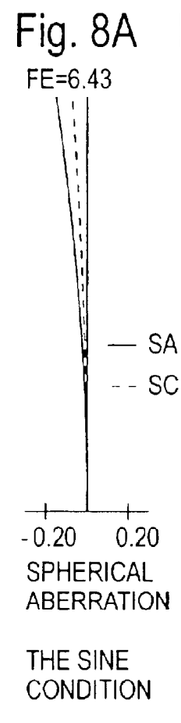
FIGS. 8A, 8B, 8C, 8D and 8E show aberrations occurred in the lens arrangement of FIG. 7.
Figures 8B, 8C, 8D:
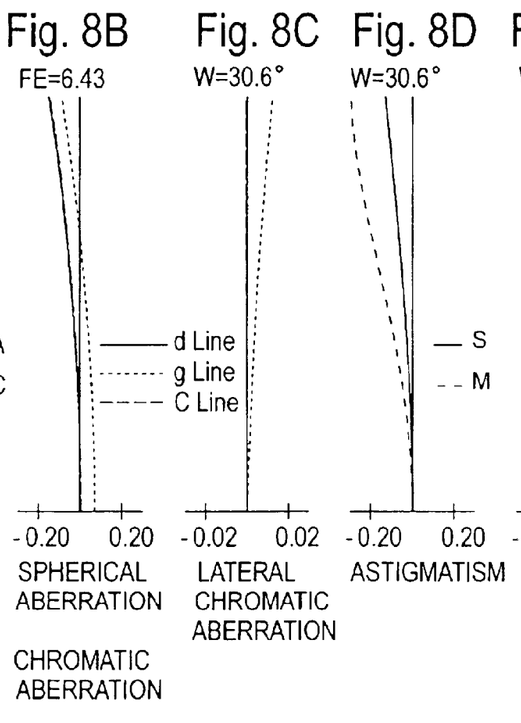
Figure 8E:
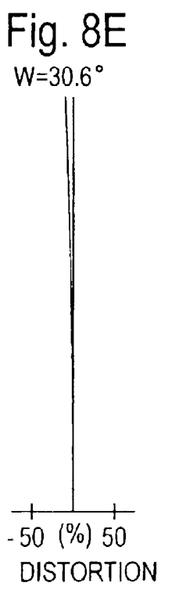

FIG. 5 is a lens arrangement of an endoscope objective optical system at the short focal length extremity (the minimum magnification position), according to the second embodiment. FIGS. 6A through 6E show aberrations occurred in the lens arrangement of FIG. 5. FIG. 7 is a lens arrangement, at the maximum magnification position, of the endoscope objective optical system according to the second embodiment. FIGS. 8A through 8E show aberrations occurred in the lens arrangement of FIG. 7. Table 2 shows the numerical values of the second embodiment. The basic lens arrangement of the second embodiment is the same as that of the first embodiment. The diaphragm S is provided 0.090 from the front side (object side) of the second lens group 20 (surface No.3).

TABLE 2

| m | −0.121—−0.825 |
|---|---|
| f | 1.328–1.987 |
| ODIS | −10.00—−2.50 |
| $f_B$ | 0.050–0.050 |
| FE | 5.73–6.43 |
| W | 70.5–30.6 |
| f1 | −1.805 |
| f2 | 2.551 |
| f4 | −7.900 |
| f23t | 2.156 |
| f23w | 2.379 |

| Surf. No. | r | d | $N_d$ | $v_d$ |
|---|---|---|---|---|
| 1 | ∞ | 0.300 | 1.88300 | 40.8 |
| 2 | 1.594 | 2.636–0.790 | — | — |
| 3 | −11.548 | 1.719 | 1.88300 | 40.8 |
| 4 | −2.016 | 1.378–0.766 | — | — |
| 5 | 8.166 | 0.300 | 1.84666 | 23.8 |
| 6 | 1.667 | 1.289 | 1.64000 | 60.1 |
| 7 | −3.199 | 0.300–2.758 | — | — |
| 8 | −5.031 | 0.300 | 1.88300 | 40.8 |
| 9 | −18.554 | 0.928 | — | — |
| 10 | ∞ | 1.000 | 1.51633 | 64.1 |
| 11 | ∞ | 0.300 | 1.53113 | 62.4 |
| 12 | ∞ | — | — | — |

[Embodiment 3]

Figure 9:
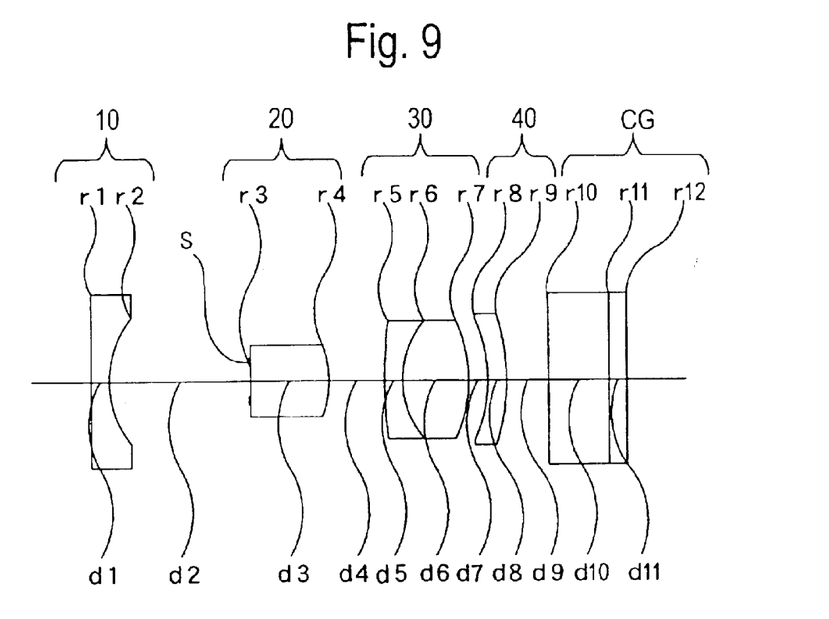
FIG. 9 is a lens arrangement of an endoscope objective optical system at the short focal length extremity (the minimum magnification position), according to a third embodiment of the present invention.
Figures 10A, 10B, 10C, 10D, 10E:
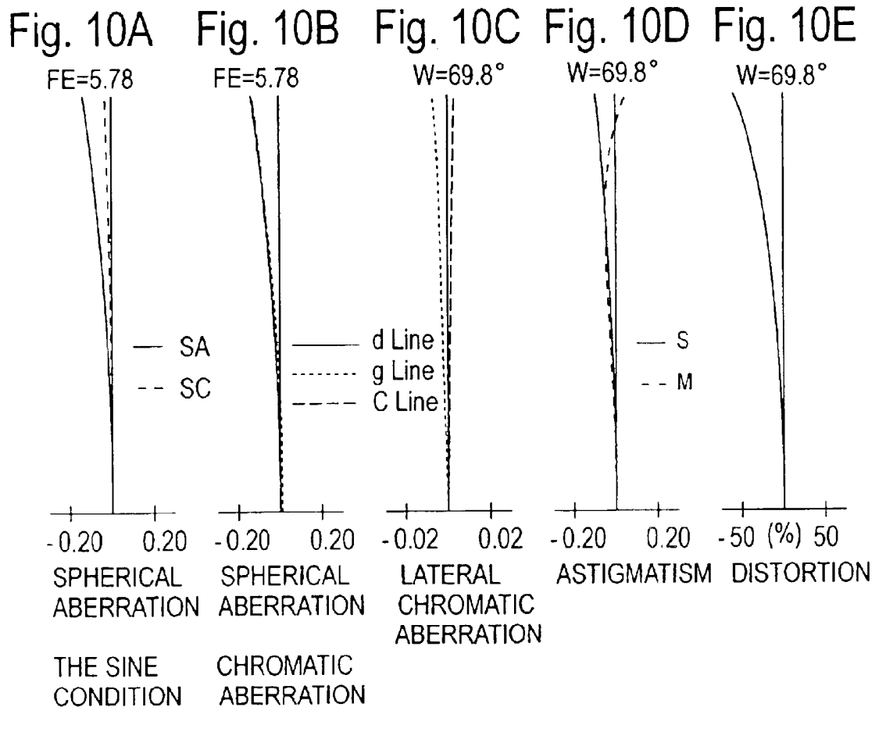
FIGS. 10A, 10B, 10C, 10D and 10E show aberrations occurred in the lens arrangement of FIG. 9.
Figure 11:
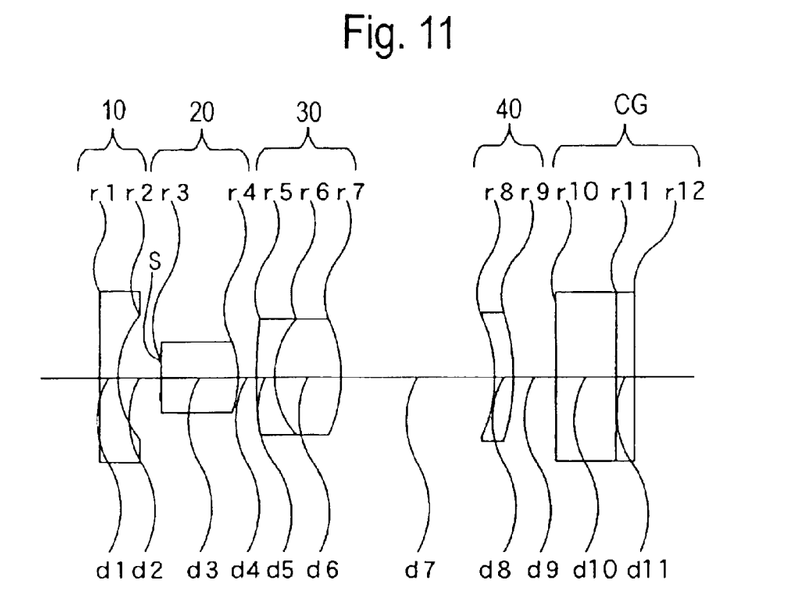
FIG. 11 is a lens arrangement, at the maximum magnification position, of the endoscope objective optical system according to the third embodiment.
Figure 12A:
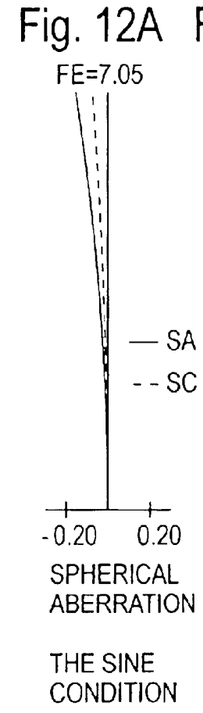
FIGS. 12A, 12B, 12C, 12D and 12E show aberrations occurred in the lens arrangement of FIG. 11.
Figures 12B, 12C, 12D, 12E:
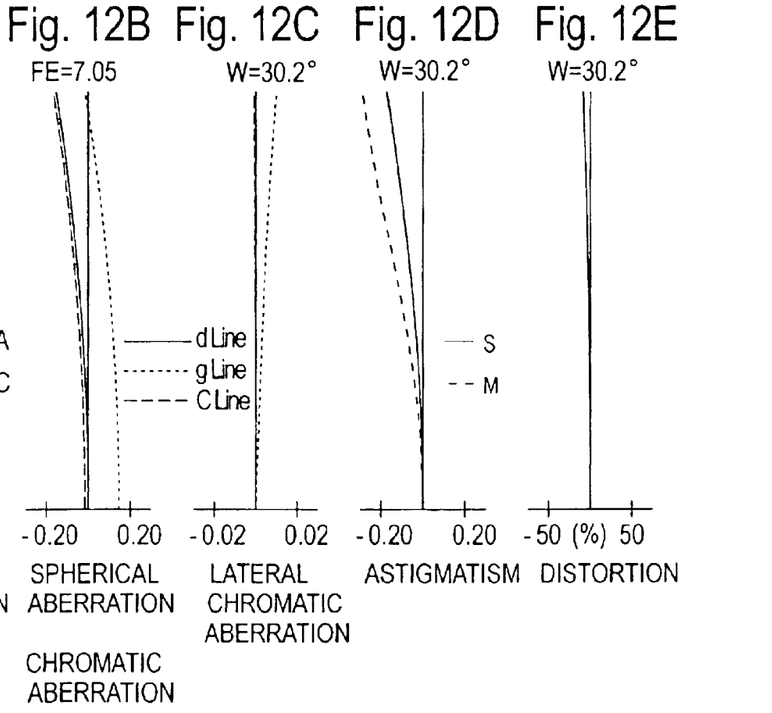

FIG. 9 is a lens arrangement of an endoscope objective optical system at the short focal length extremity (the minimum magnification position), according to the third embodiment. FIGS. 10A through 10E show aberrations occurred in the lens arrangement of FIG. 9. FIG. 11 is a lens arrangement, at the maximum magnification position, of the endoscope objective optical system according to the third embodiment. FIGS. 12A through 12E show aberrations occurred in the lens arrangement of FIG. 11. Table 3 shows the numerical values of the third embodiment. The basic lens arrangement of the third embodiment is the same as that of the first embodiment. The diaphragm S is provided 0.030 from the front side (object side) of the second lens group 20 (surface No.3).

TABLE 3

| m | −0.119—−0.826 |
|---|---|
| f | 1.303–1.941 |
| ODIS | −10.00—−2.50 |
| $f_B$ | 0.050–0.050 |
| FE | 5.78–7.05 |
| W | 69.8–30.2 |
| f1 | −1.897 |
| f2 | 2.214 |
| f4 | −9.952 |
| f23t | 1.883 |
| f23w | 2.099 |

| Surf. No. | r | d | $N_d$ | $v_d$ |
|---|---|---|---|---|
| 1 | ∞ | 0.300 | 1.88300 | 40.8 |
| 2 | 1.675 | 2.368–0.730 | — | — |
| 3 | ∞ | 1.290 | 1.77250 | 49.6 |
| 4 | −1.710 | 0.931–0.305 | — | — |
| 5 | 8.450 | 0.300 | 1.84666 | 23.8 |
| 6 | 1.517 | 1.100 | 1.58913 | 61.2 |
| 7 | −2.332 | 0.320–2.584 | — | — |
| 8 | −2.459 | 0.310 | 1.84666 | 23.8 |
| 9 | −3.673 | 0.705 | — | — |
| 10 | ∞ | 1.000 | 1.51633 | 64.1 |
| 11 | ∞ | 0.300 | 1.53113 | 62.4 |
| 12 | ∞ | — | — | — |

[Embodiment 4]

Figure 13:
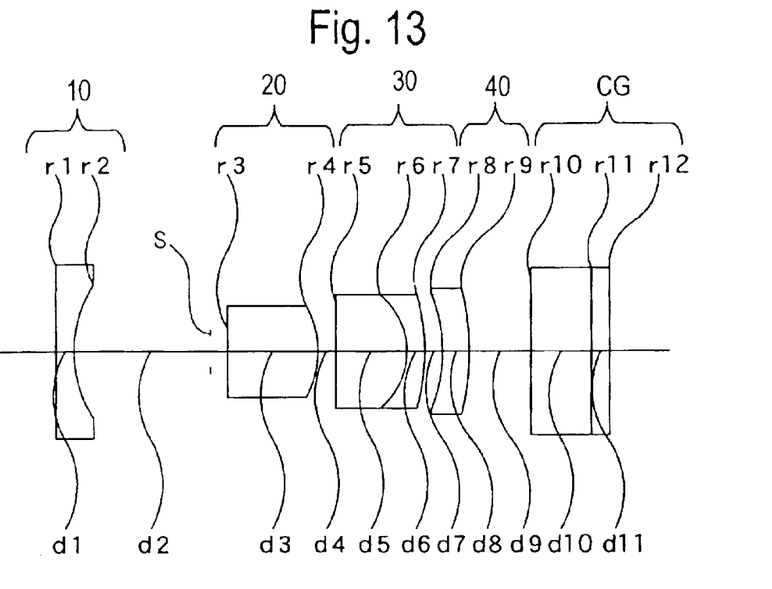
FIG. 13 is a lens arrangement of an endoscope objective optical system at the short focal length extremity (the minimum magnification position), according to a fourth embodiment of the present invention.
Figure 14A:
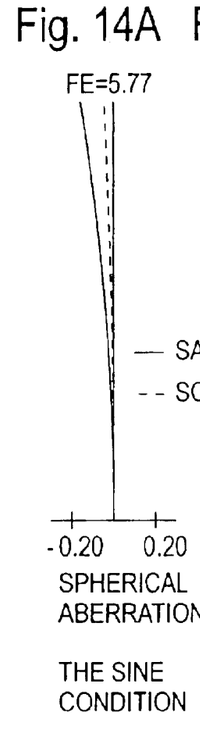
FIGS. 14A, 14B, 14C, 14D and 14E show aberrations occurred in the lens arrangement of FIG. 13.
Figure 14B:
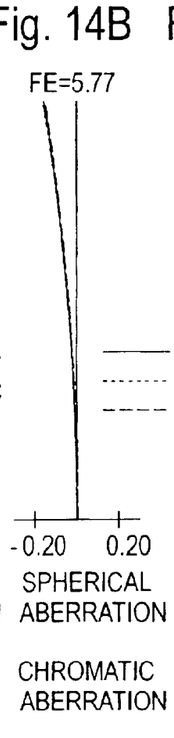
Figure 14C:
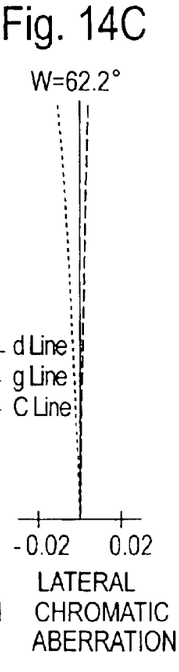
Figures 14D, 14E:
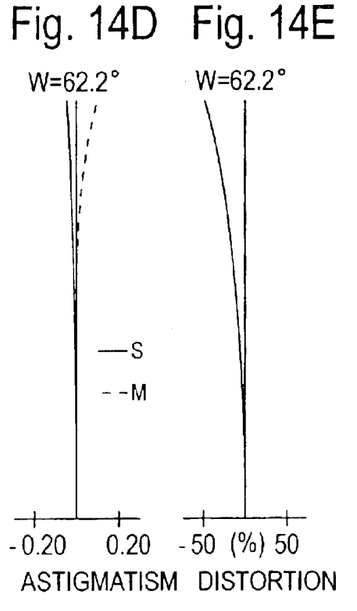
Figure 15:
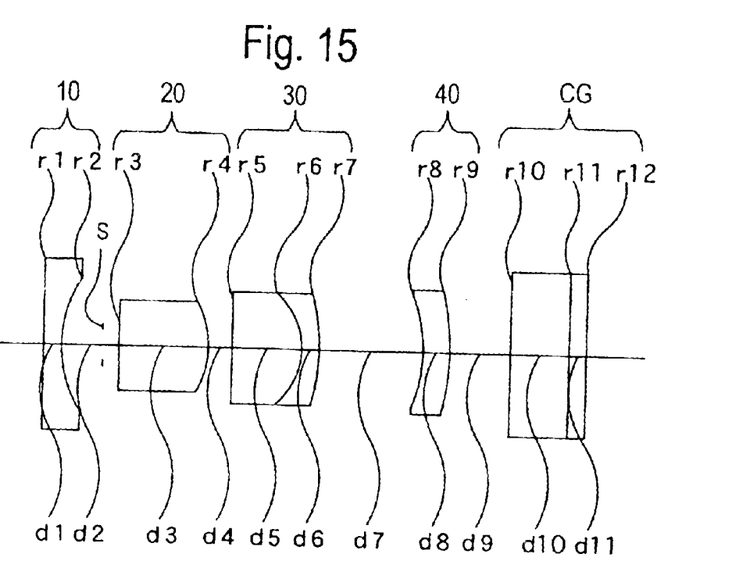
FIG. 15 is a lens arrangement, at the maximum magnification position, of the endoscope objective optical system according to the fourth embodiment.
Figures 16A, 16B:
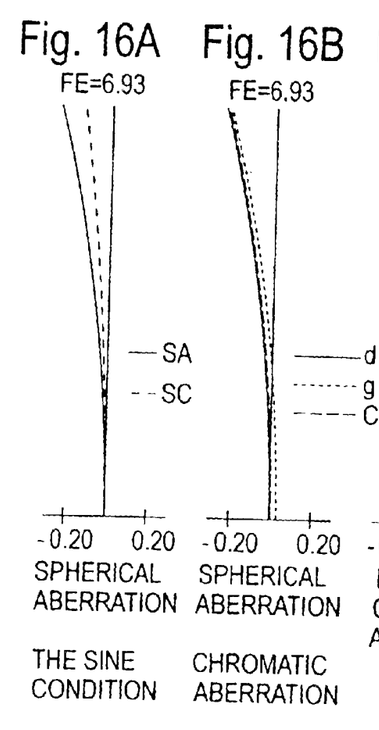
FIGS. 16A, 16B, 16C, 16D and 16E show aberrations occurred in the lens arrangement of FIG. 15.
Figure 16C:
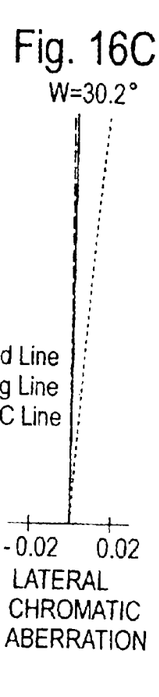
Figure 16D:
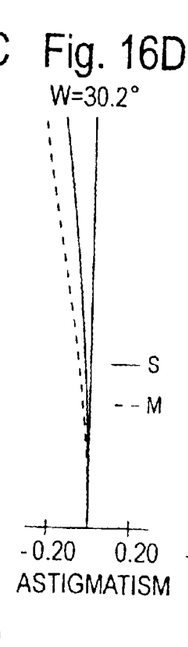
Figure 16E:
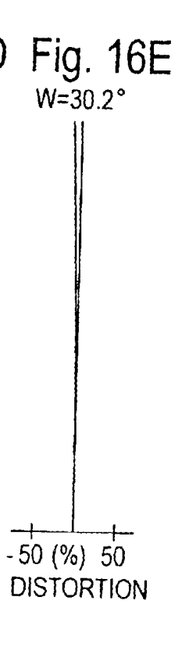

FIG. 13 is a lens arrangement of an endoscope objective optical system at the short focal length extremity (the minimum magnification position), according to the fourth embodiment. FIGS. 14A through 14E show aberrations occurred in the lens arrangement of FIG. 13. FIG. 15 is a lens arrangement, at the maximum magnification position, of the endoscope objective optical system according to the fourth embodiment. FIGS. 16A through 16E show aberrations occurred in the lens arrangement of FIG. 15. Table 4 shows the numerical values of the fourth embodiment. The basic lens arrangement of the fourth embodiment is the same as that of the first embodiment except that the positive third lens group 30 includes a positive lens element and a negative lens element in this order from the object. The diaphragm S is provided 0.281 from the front side (object side) of the second lens group 20 (surface No. 3).

TABLE 4

| m | −0.130—−0.827 |
|---|---|
| f | 1.426–1.988 |
| ODIS | −10.00—−2.50 |
| $f_B$ | 0.050–0.050 |
| FE | 5.77–6.93 |
| W | 62.2–30.2 |
| f1 | −2.378 |
| f2 | 2.095 |
| f4 | −7.791 |
| f23t | 1.937 |
| f23w | 1.914 |

| Surf. No. | r | d | $N_d$ | v |
|---|---|---|---|---|
| 1 | ∞ | 0.300 | 1.88300 | 40.8 |
| 2 | 2.100 | 2.562–0.981 | — | — |
| 3 | −71.482 | 1.497 | 1.80400 | 46.6 |
| 4 | −1.661 | 0.300–0.400 | — | — |
| 5 | ∞ | 1.200 | 1.69680 | 55.5 |
| 6 | −1.227 | 0.300 | 1.84666 | 23.8 |
| 7 | −3.560 | 0.300–1.771 | — | — |
| 8 | −2.527 | 0.450 | 1.84666 | 23.8 |
| 9 | −4.431 | 1.026 | — | — |
| 10 | ∞ | 1.000 | 1.51633 | 64.1 |
| 11 | ∞ | 0.300 | 1.53113 | 62.4 |
| 12 | ∞ | — | — | — |

Table 5 shows the numerical values of each condition for each embodiment.

TABLE 5

|          | Embod. 1 | Embod. 2 | Embod. 3 | Embod. 4 |
|----------|----------|----------|----------|----------|
| Cond. (1) | −4.732 | −5.949 | −7.638 | −5.464 |
| Cond. (2) | −1.715 | −1.359 | −1.456 | −1.668 |
| Cond. (3) | 1.803 | 1.921 | 1.699 | 1.469 |
| Cond. (4) | 0.704 | 0.606 | 0.602 | 0.726 |

As can be understood from Table 5, each embodiment satisfies each condition. Furthermore, as can be understood from the aberration diagrams, the various aberrations are relatively well corrected.

According to the above description, an endoscope objective optical system, in which (i) the focal length is variable by moving a portion of a lens group, (ii) normal viewing at a wide viewing angle and magnified viewing at a high magnification are possible, (iii) the overall length is made shorter, and (iv) the diameter of the lens group is made smaller, can be obtained.

What is claimed is:

1. An endoscope optical system comprising, an endoscope objective comprising a negative first lens group, a positive second lens group, a positive third lens group, and a negative fourth lens group, in this order from an object, wherein said positive second lens group and said positive third lens group are moved to vary a distance between them (i) at a short focal length extremity and (ii) at a maximum magnification position without changing the overall length from said negative first lens group to an image plane, and the focal length of said endoscope objective is varied while maintaining an in-focus state.

2. The endoscope optical system according to claim 1, satisfying the following condition:

$$-10<f4/fw<-3$$

wherein f4 designates the focal length of said negative fourth lens group, and fw designates the focal length of said endoscope objective at the short focal length extremity.

3. The endoscope optical system according to claim 1, wherein said negative first lens group comprises a negative single lens element that satisfies the following condition:

$$-2<f1/fw<-1.2$$

wherein f1 designates the focal length of said negative first lens group, and fw designates the focal length of said endoscope objective at the short focal length extremity.

4. The endoscope optical system according to claim 1, satisfying the following conditions:

$$1.2<f2/fw<2.1$$

$$0.5<(f23t\times fw)/(f23w\times ft)<1.5$$

wherein f2 designates the focal length of said positive second lens group;

f23t designates the combined focal length of said positive second lens group and said positive third lens group when said endoscope objective is at the maximum magnification position;

f23w designates the combined focal length of said positive second lens group and said positive third lens group at the short focal length extremity;

ft designates the focal length of said endoscope objective at the maximum magnification position, and fw designates the focal length of said endoscope objective at the short focal length extremity.

5. An endoscope comprising said endoscope objective optical system according to claim 1.

6. The endoscope optical system according to claim 1, further comprising a diaphragm positioned on the object side of said positive second lens group, said diaphragm configured to move together with said positive second lens group.

7. An endoscope optical system comprising:

an endoscope objective comprising a negative first lens group, a positive second lens group, a positive third lens group, and a negative fourth lens group, in this order from an object, wherein said positive second lens group and said positive third lens group are movable to vary a distance between them without changing the overall length from said negative first lens group to an image plane, and the focal length of said endoscope objective is varied while maintaining an in-focus state.

8. The endoscope optical system according to claim 7, satisfying the following condition:

$$-10<f4/fw<-3$$

wherein f4 designates the focal length of said negative fourth lens group, and fw designates the focal length of said endoscope objective at the short focal length extremity.

9. The endoscope optical system according to claim 7, wherein said negative first lens group comprises a negative single lens element that satisfies the following condition:

$$-2<f1/fw<-1.2$$

wherein f1 designates the focal length of said negative first lens group, and designates the focal length of said endoscope objective at the short focal length extremity.

10. The endoscope optical system according to claim 7, satisfying the following conditions:

$$1.2<f2/f<2.1$$

$$0.5<(f23t\times fw)/(f23w\times ft)<1.5$$

wherein f2 designates the focal length of said positive second lens group;

f23t designates the combined focal length of said positive second lens group and said positive third lens group when said endoscope objective is at the maximum magnification position;

f23w designates the combined focal length of said positive second lens group and said positive third lens group at the short focal length extremity;

ft designates the focal length of said endoscope objective at the maximum magnification position; and fw designates the focal length of said endoscope objective at the short focal length extremity.

11. An endoscope comprising said endoscope objective according to claim 7.

12. The endoscope optical system according to claim 7, further comprising a diaphragm positioned on the object side of said positive second lens group, said diaphragm configured to move together with said positive second lens group.

* * * * *